Patented Apr. 10, 1951

2,548,585

UNITED STATES PATENT OFFICE 2,548,585

ALKYLATION OF UREA WITH OLEFINS

Herbert C. Brown, West Lafayette, Ind., assignor to Standard Oil Company, Chicago, Ill., a corporation of Indiana No Drawing. Application November 12, 1948, Serial No. 59,757

15 Claims. (Cl. 260—553)

This invention relates to a process for the preparation of N-t-alkyl ureas, particularly N,N'-di-t-alkyl ureas. The invention also encompasses a unitary process for the conversion of urea to N-t-alkyl amines.

One object of this invention is to provide a process for the alkylation of urea or alkyl ureas containing an —NH$_2$ group with tertiary olefins like isobutylene in the presence of strong acid catalysts such as sulfuric acid to produce good yields of N-t-alkyl and N,N'-di-t-alkyl ureas. Another object of this invention is to provide an alkylation process of the type under consideration which will afford a maximum yield of alkylated product, particularly a substantial yield of N,N'-di-t-alkyl urea. An additional object of this invention is to provide a process for the conversion of reactive tertiary olefins such as isobutylene, which are produced commercially in large quantities in petroleum refineries, to N-t-alkyl amines. Still another object of this invention is to provide a novel method for working up the reaction mixtures produced in the alkylation process of this invention, particularly to separate N,N'-di-t-alkyl ureas such as N,N'-di-t-butyl urea, from N-t-alkyl ureas such as N-t-butyl urea. These and other objects of this invention will become apparent from the ensuing description thereof.

In accordance with this invention, urea or an N-alkyl urea containing an —NH$_3$ group is alkylated by bringing it into intimate contact with a reactive tertiary olefin such as isobutylene in the presence of a sulfuric acid catalyst. Careful control of the reaction variables is necessary to obtain a high degree of alkylation of the available nitrogen in the urea compound being treated and also to produce satisfactory yields of N,N'-di-t-alkyl ureas, as will be more fully brought out in the examples below. Although the following examples are concerned with the alkylation of urea and N-t-butyl urea with isobutylene, it should be understood that other reactive tertiary olefins may be employed instead and that petroleum refinery products containing said tertiary olefins may be used instead of pure olefins, for example petroleum refinery C$_4$ fractions derived from cracking operations, and the like.

In the following examples, except as otherwise expressly indicated, the urea and sulfuric acid catalysts were mixed in the ratio indicated, brought to the indicated reaction temperature and liquid isobutylene added with vigorous agitation of the reaction mixture and cooling to remove the heat of reaction. Upon completion of the alkylation reaction, the reaction mixture was diluted with between about 1 and 4 volumes of cold water, whereupon solid N,N'-di-t-butyl urea separated and was removed from the reaction mixture by filtration. When the N,N'-di-t-butyl urea was contaminated by isobutylene polymer, the polymer was removed by washing the precipitate with petroleum ether. When the filtrate contained oily isobutylene polymer, the polymer was separated as a distinct liquid layer by settling and decantation. The filtrate was then neutralized with caustic, whereupon solid N-t-butyl urea separated and was filtered from the remaining reaction mixture. The yields of N-alkyl ureas in the following tabulation of examples are expressed as percent of theoretical based upon the amount of urea charged. The available nitrogen utilization in the following table is calculated upon the basis that no more than one t-butyl group can be introduced into each nitrogen of the urea.

| Ex. No. | Urea, Mols | Isobutylene, Mols | H$_2$SO$_4$ conc., weight per cent | H$_2$SO$_4$, Mols | Temp., ° C. | Time, hours | Yields, Per Cent of Theo. | | Mols, Isobutylene Polymerized | Available Nitrogen Utilization, Per Cent of Theory | Effect Illustrated, Variation of | Remarks |
|---|---|---|---|---|---|---|---|---|---|---|---|---|
| | | | | | | | N-t-Butyl Urea | N,N'-di-t-Butyl Urea | | | | |
| 1 | 1 | 4 | 65 | 2 | 30–35 | 7 | 17 | 0 | 0 | 8.5 | H$_2$SO$_4$ conc. | 1 atm. Urea and H$_2$SO$_4$ premixed and isobutylene added. |
| 2 | 1 | 4 | 78 | 2 | 25 | 18 | 33 | 12 | 0 | 28.5 | | Autogeneous pressure. |
| 3 | 1 | 4 | 95 | 2 | −5 to −15 | | 20 | 43 | 2.0 | 53 | | 1 Atm. |
| 4 | 1 | 6 | 95 | 2 | −5 to −15 | | 34 | 40 | 1.8 | 57 | | Do. |
| 5 | 1 | 2.4 | 96 | 2 | −5 to −10 | | 33 | 36.5 | 0.14 | 53 | | |
| 6 | 1 | 2.4 | 97 | 2 | −5 to −10 | | 46 | 29.5 | 0.54 | 52.5 | | |
| 7 | 1 | 2.5 | 98 | 2 | −5 to −10 | | 53 | 19 | 0.54 | 45 | | |
| 8 | 1 | 2.5 | 99 | 2 | −5 to −10 | | 51 | 16 | 0.66 | 41.5 | | |
| 9 | 1 | 2.4 | 100 | 2 | −5 to −10 | | 46 | 12 | 1.8 | 35 | | |
| 10 | 1 | 2.5 | 10% oleum | 2.2 | −5 to −10 | | 48 | 13 | 0.43 | 37 | | SO$_3$ considered ≡ H$_2$SO$_4$ in calculating mols of H$_2$SO$_4$. Temp. control was difficult. |

| Ex. No. | Urea, Mols | Isobutylene, Mols | H₂SO₄ conc., weight per cent | H₂SO₄, Mols | Temp., °C. | Time, hours | Yields, Per Cent of Theo. N-t-Butyl Urea | Yields, Per Cent of Theo. N,N'-di-t-Butyl Urea | Mols, Isobutylene Polymerized | Available Nitrogen Utilization, Per Cent of Theory | Effect Illustrated, Variation of | Remarks |
|---|---|---|---|---|---|---|---|---|---|---|---|---|
| 11 | 1 | 4 | 95 | 1.5 | −10 to −20 | 2 | 21 | 31 | 1.3 | 41.5 | H₂SO₄: Urea. | In Examples 11–14, liquid isobutylene was added with stirring to a mixture of urea and H₂SO₄ at −10° C. |
| 12 | 1 | 2 | 95 | 1.5 | −10 | 2 | 10.8 | 10.7 | 0.4 | 16.1 | | |
| 13 | 1 | 4 | 95 | 2 | −10 to −20 | 2 | 33 | 40 | 1.2 | 56.5 | | |
| 14 | 1 | 4 | 95 | 2 | −5 to −15 | | 20 | 43 | 2.0 | 53 | | In Example 12 the urea-H₂SO₄ solution was extremely vuscous and difficult to stir. |
| 15 | 1 | 4 | 95 | 3 | −10 to −20 | 2 | 50 | 7 | 2.5 | 32 | | |
| 16 | 1 | 4 | 95 | 4 | −10 to −20 | 2 | 61 | 1.5 | 1.8 | 32 | | |
| 5 | 1 | 2.4 | 96 | 2 | −5 to −10 | | 33 | 36.5 | 0.14 | 53 | i-C₄=: Urea. | |
| 17 | 1 | 2.2 | 95 | 2 | −15 to −20 | | 34 | 35 | 0 | 47 | | |
| 26 | 1 | 3 | 96 | 2 | −5 to −10 | | 39 | 37 | 0.2 | 56 | | Gaseous isobutylene charged. |
| 18 | 1 | 4.1 | 96 | 2 | −5 to −10 | 2 | 33 | 53 | 0.7 | 69 | | |
| 13 | 1 | 4 | 95 | 2 | −10 to −20 | 2 | 33 | 40 | 1.2 | 56.5 | | |
| 19 | 1 | 6 | 96 | 2 | −5 to −10 | 3 | 33.5 | 55 | 0.9 | 72 | | 0.92 mol unreacted isobutylene recovered. |
| 17 | 1 | 2.2 | 95 | 2 | −15 to −20 | | 24 | 35 | 0 | 47 | Temp. | |
| 20 | 1 | 2.5 | 95 | 2 | −10 to −15 | | 26 | 39 | 0 | 52 | | |
| 21 | 1 | 2.8 | 95 | 2 | −5 to −10 | | 34 | 31 | Trace | 48 | | |
| 22 | 1 | 2.6 | 95 | 2 | −5 | | 45 | 28 | 0.14 | 50 | | |
| 2 | 1 | 4 | 78 | 2 | 25 | 18 | 33 | 12 | 0 | 28.5 | | |
| 1 | 1 | 4 | 65 | 2 | 30 to 35 | 7 | 17 | 0 | 0 | 8.5 | | |
| 23 | 1 | 4 | 78 | 2 | 50 | 18 | 0 | 0 | 3.6 | 0 | | Temp. too high. |
| 13 | 1 | 4 | 95 | 2 | −10 to −20 | | 33 | 40 | 1.2 | 56.5 | Order of Addition. | Liquid isobutylene added to urea-H₂SO₄ mixture at −10° C. |
| 24 | 1 | 4 | 95 | 2 | −10° | | 15 | 22 | 1.5 | 30 | | Urea-H₂SO₄ mixture added to liquid isobutylene. |
| 25 | 1 | 1 | 95 | 1 | −10 | | 0 | 0 | | | | Isobutylene and H₂SO₄ mixed and urea added to the mixture. Only i-butylene polymer was produced. |
| 26 | 1 | 3 | 96 | 2 | −5 to −10 | | 39 | 37 | 0.2 | 56 | Isobutylene condition. | Gaseous isobutylene passed into urea-H₂SO₄ mixture at rate of 1 mcl per hour; complete absorption. |
| 5 | 1 | 2.4 | 96 | 2 | −5 to −10 | | 33 | 36.5 | 0.14 | 53 | | Liquid isobutylene added to urea-H₂O₄ mixture. |
| 27 | 1 | 2.2 | (a) 100 | 2 | −5 to −10 | | 35 | 31 | 0.22 | 51 | Catalyst. | (a) Catalyst was a mixture of 23 parts of 85% H₃PO₄ and 77 parts of 20% oleum. |
| 28 | (b) 1 | 2 | 95 | 3 | −10 to −15 | | | 29 | 0.5 | | Feed Stock | (b) Feed was N-t-butyl urea. Recovered feed was 0.2 mols; 0.5 mols not accounted for, possibly decomposed in the reactor. |
| 29 | (c) 0.1 | 0 | 95 | 0.3 | −10 | | | | | | do | (c) Feed was N-t-butyl urea. Recovered 16 weight percent of feed. No polymer formed. After neutralization, mixture had odor of t-butanol. |
| 30 | (d) 0.1 | 0 | 95 | 0.6 | −10 to −15 | | | | 0.09 | | | (d) Feed was N,N'-di-t-butyl urea. No N-t-butyl urea could be recovered. All the feed apparently decomposed. |

In the above table Examples 1 to 10, inclusive, illustrate the effects of varying the concentration of the sulfuric acid employed as a catalyst. In these examples about 2 mols of sulfuric acid were employed per mol of urea, the acid concentration was varied in the range of 65 weight percent of sulfuric acid to 10 percent oleum and the isobutylene : urea mol ratio was varied between 2.4 and 6. It will be noted that satisfactory nitrogen utilization was obtained in Examples 2 to 10, and that substantial yields of N,N'-di-t-butyl urea were obtained in these examples, in which the sulfuric acid concentration varied between 78 weight percent and 10 percent oleum. The nitrogen utilization values indicate no advantage for operating with 100 percent sulfuric acid or fuming sulfuric acid (Examples 9 and 10) as compared with 95 to 99 weight percent sulfuric acid (Examples 2 to 8). It is apparent from Examples 4 to 6, inclusive, that commercial concentrated sulfuric acid is suitable for the alkylation process of the present invention, since with acid of about this strength the nitrogen utilization is high and high yields of both N-t-butyl and N,N'-di-t-butyl urea can be obtained. In Example 10, wherein 10 percent oleum was employed as a catalyst, not only were the yields of desired product somewhat lower, but control of the temperature of the reaction mixture was also difficult to achieve.

In Examples 11 to 16 the principal variable studied was the molar ratio of sulfuric acid to urea. It was found that when the acid : urea mol ratio was one, urea sulfate was formed and the reaction mass was difficult or impossible to agitate in order to bring it in contact with isobutylene. As will be apparent from Examples 11 to 16, sulfuric acid : urea mol ratios of 1.5 to 4 led to substantial nitrogen utilization, although total nitrogen utilization and yields of N,N'-di-t-butyl urea fell off substantially at acid : urea ratios of 3 and 4 (Examples 15 and 16). It will be noted that high available nitrogen utilizations and high yields of both N-t-butyl and N,N'-di-t-butyl ureas were obtained at the sulfuric acid : urea mol ratio of 2 and sulfuric acid : urea mol ratios of about 1.5 to about 2.5 are preferred both from the standpoint of available nitrogen utilization and yields of N,N'-di-t-butyl urea.

The effects of variation in the isobutylene : urea mol ratio are illustrated in the next group of examples (Examples 5, 13, 17, 18, 19 and 26). An isobutylene : urea mol ratio of at least about 2 is necessary in order to obtain substantial nitrogen utilization and the production of desirable yields of even N-t-butyl urea. In order to obtain desirable yields of N,N'-di-t-butyl urea the isobutylene : urea mol ratio is desirably at least about 4. A comparison of Examples 18 and 19 indicates that the isobutylene : urea molar ratio of 6 is somewhat excessive, since the yields of alkyl ureas and available nitrogen utilizations were not substantially different and a considerable amount of unreacted isobutylene was recovered in Example 19, whereas complete isobutylene utilization was obtained in Example 18.

The effects of reaction temperature variation in the range of about —20 to +50° C. are illustrated in the succeeding group of Examples (1, 2, 17, 20–23, inclusive). It will be noted that yields of alkylated products and total available nitrogen utilization were substantial in the temperature range of —25 to +25° C., especially the temperature range of —5 to —20° C. The only product which was isolated at 50° C. was isobutylene polymer (Example 23). No N,N'-di-t-butyl urea was recovered at a temperature of 30–35° C. (Example 1) although it is probable that by increasing the acid strength somewhat from 65 percent to about 75 or 80 percent some N,N'-di-t-butyl urea could be obtained.

The effects of the order of addition of the reactants to each other are illustrated in Examples 13, 24 and 25. A comparison of Examples 13 and 24 indicates that the preferred mode of operation is to add the isobutylene to the urea-H₂SO₄ mixture, since the reverse order of addition, i. e., urea-H₂SO₄ to isobutylene substantially halves the product yields. No alkylation products could be obtained when urea was added to an isobutylene-H₂SO₄ mixture (Example 25), which illustrates the importance of maintaining a very low concentration of free olefin in the reaction mixture, i. e. bringing the olefin into contact with the acid catalyst only in the presence of a substantial amount of alkylatable material (urea). Since the production of a substantial amount of t-butyl-sulfate would be expected to result from mixing one mol of concentrated sulfuric acid with one mol of liquid isobutylene, Example 25 casts doubt on the hypothesis that t-butyl sulfate might be the actual alkylating agent in the isobutylene-urea alkylation reaction.

A comparison of Examples 26 and 5 indicates the substantial equivalence of gaseous and liquid isobutylene as alkylating agents for urea.

Example 27 wherein a mixture of phosphoric and sulfuric acids was employed gave results substantially equivalent to those obtained with concentrated sulfuric acid.

In Example 28 the feed stock was N-t-butyl urea. It will be noted that a substantial yield of N,N'-di-t-butyl urea was obtained, but it appears that a considerable proportion of the feed stock was decomposed by the strong sulfuric acid catalyst.

In Example 29, N-t-butyl urea was brought into contact with concentrated sulfuric acid in the absence of added isobutylene. No disproportionation of the feed stock to produce N,N'-di-t-butyl urea was observed. In Example 30, an attempt to disproportionate N,N'-di-t-butyl urea to produce N-t-butyl urea likewise proved unsuccessful.

In carrying out the alkylation process of the present invention it has been repeatedly observed that close control of the reaction temperature, intimate agitation and intermingling of the reactants and rapid removal of the heat of alkylation are essential to obtain good yields of the desired alkylation products. It is highly desirable to use dry reactants, as it has been observed in some instances that the use of undried reactants results in increased yields of olefin polymers.

Although indirect heat exchange may be used to control the temperature in the alkylation reactor, this may desirably be supplemented with or supplanted by direct heat exchange with a non-reactive diluent in the reaction mixture. Thus, it is desirable to employ an inert diluent which boils at about the desired reaction temperature and to remove heat from the reaction mixture by vaporization of the diluent; diluent vapors are then condensed, for example in a conventional condenser using indirect heat exchange, and refluxed back to the reaction mixture to remove further quantities of heat. When it is desired to maintain the alkylation reaction temperature at about 0° C. and to use essentially atmospheric pressure in the reaction zone, it is desirable to use liquid n-butane as an inert, vaporizable diluent to remove heat from the reaction zone. Other hydrocarbon diluents, for example n-pentane, n-hexane and the like may also be used. Inert diluents other than hydrocarbons may also be employed, and we have successfully employed certain perfluorinated hydrocarbons (fluorocarbons) as inert, direct heat exchange media. The use of inert diluents of suitable boiling point has been found markedly to reduce the unwanted side reaction of olefin polymerization while effecting the alkylation process of this invention.

Although the alkylation process of this invention has been described with particular reference to the alkylation of urea and N-t-butyl urea with isobutylene, it will be apparent that it is capable of considerable variation. Thus, the alkylation process of this invention may be effected upon substituted, for example, N-alkylated, ureas, providing that the urea compound charging stock contains an —NH$_2$ group. Thus, the alkylation process of the present invention may be practiced upon N-primary alkyl ureas such as N-methyl urea, N-ethyl urea, N-dodecyl urea and the like; N-sec-alkyl ureas, such as N-isopropyl urea, N-isobutyl urea, etc.; N-tert-alkyl ureas, such as N-t-butyl urea, N-t-amyl urea, N-t-methylcyclopentyl urea, and the like. N,N-di-primary-alkyl ureas, e. g., N,N-di-methyl urea, may also be treated by the process of this invention.

In lieu of or together with isobutylene, other reactive tert-olefins may be employed, e. g. trimethylethylene, 1-methylcyclohexene and the like. When mixtures of reactive tert-olefins and ethylene or secondary olefins are employed, the tert-olefins alkylate selectively under the conditions of this invention.

Although I have described specific examples of the process of this inveintion in some detail, the examples are merely illustrative of the invention and do not necessarily define its scope. In general, I may employ reaction temperatures between about —30° C. and 40° C., but prefer to employ temperatures in the proximity of 0° C.; total olefin : urea mol ratios between about 2 and 6 or even more, preferably about 4 to 5; H$_2$SO$_4$ : urea mol ratios of about 1.2 to about 4, preferably about 1.5 to 2.5; H$_2$SO$_4$ strengths between about 75 weight percent and various fuming sulfuric acids, e. g., 10 percent or 20 percent fuming sulfuric acid, preferably 90 to 100 percent sulfuric acid and particularly the concentrated sulfuric acid of commerce. Sufficient time is provided to obtain substantial reaction, but the alkylation reaction is sufficiently rapid to eliminate the time factor as an engineering problem. In the separation of N,N'-di-t-alkyl ureas from the reaction mixtures, I may dilute the reaction mixtures between about 1 and about 4 or even a greater volume of water at temperatures between about —10° C. and about 25° C.

Surprisingly, it has been observed that t-alkanols are not equivalents of t-olefins such as isobutylene for the purposes of the present alkylation process. Thus, when about 2 mols of isobutylene are reacted with one mol of urea (as in Example 17), about 35 percent of the theoretical yield of N,N'-di-t-butyl urea is produced, whereas upon the substitution of 2 mols of t-butanol, no N,N'-di-t-butyl urea was produced, as will be shown by the following data. To 206 g. (2 mols) of 95 weight percent sulfuric acid in a one-liter flask, cooled in an ice bath was added 60 g. (1 mol) of urea. The rate of urea addition was sufficiently slow to prevent the temperature in the flask from exceeding 25° C. To the resultant mixture, t-butanol was added in the amount of 148 g. (2 mols) at 15 to 25° C. The reaction mixture was allowed to stand at room temperature for about twenty hours, and then was diluted with about one liter of water and neutralized with 30 percent aqueous sodium hydroxide with cooling. The white crystalline precipitate was collected, washed carefully with water, and dried. The yield of N-t-butyl urea was 81.2 g. (70 percent); M. P. 173–4° (dec.). The decomposition point for N-t-butyl urea reported in Beilstein is 172° C.

In an attempt to prepare N,N'-di-t-butyl urea, a mixture of one mol of urea, three moles of concentrated (94%) sulfuric acid, and two moles of t-butanol was allowed to stand at room temperature for about twenty hours. A liquid isobutylene polymer layer formed which accounted for 96 percent of the t-butanol used. None of the desired product was formed.

The employment of t-pentanol, likewise, did not lead to the production of N,N'-di-t-amyl urea, as shown by the following data. To a mixture of 60 g. (1 mol) of urea and 206 g. (2 mols) of 95 percent sulfuric acid was added 176 g. (2 mols) of t-amyl alcohol at 18–21° C. slowly and with stirring. The reaction mixture was allowed to stand at room temperature for twenty hours, and then was diluted to a volume of about one liter with water. A small amount of an oily upper layer (polymer) was separated, and the aqueous layer was neutralized with 30 percent aqueous sodium hydroxide. N-t-amyl urea precipitated, and after coagulating, it was collected on a Büchner funnel, washed well with water, and dried in an oven at 75–80° C.; yield, 83 g. (64 percent); M. P., 152–3° C.; reported, M. P. 151° C. (Beilstein, vol. 4, p. 179). No. N,N'-di-t-amyl urea was found.

It has also been observed that t-butyl chloride is not an equivalent of isobutylene for the alkylation of urea, as shown by the following experiment. To 133 g. of a stock solution of urea and 95 percent sulfuric acid, containing 30 g. (0.5 mol) of urea, was added 92.5 g. (1 mol) of t-butyl chloride slowly and with stirring while maintaining the temperature at 20 to 25° C. The two-phase system was stirred at room temperature (about 30° C.) for about twenty hours. The lower acid layer was withdrawn, and the upper layer was washed with water, dried, and distilled. It was found to be entirely unchanged t-butyl chloride (B. P. 51–52° C.); weight recovered, 78.3 g. (85 percent). The acid layer was diluted with water and neutralized, but no precipitate of t-butyl urea was obtained.

The N-t-alkyl and N,N'-di-t-alkyl ureas produced by the process of the present invention are interesting intermediates for the synthesis of t-alkyl amines, for example mono- and di-t-butyl amines. The hydrolysis of t-alkyl amines is effected under alkaline conditions, preferably in the presence of a high boiling reaction solvent.

The inadequacy of acid hydrolysis for the production of amines from N-t-butyl urea is illustrated by the following experiments.

A mixture of 29 g. (0.25 mol) of N-t-butyl urea and 150 g. of 50 percent sulfuric acid was heated under reflux. The t-butyl urea dissolved and presently gases were evolved which were identified as isobutylene and carbon dioxide. After several minutes' refluxing, a separate liquid layer of polyisobutylene appeared on the surface of the reaction mixture. Instead of the desired hydrolysis, the reaction that evidently occurred was:

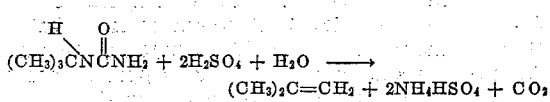

When a mixture of 29 g. (0.25 mol) of N-t-butyl urea and 150 g. of 37 percent hydrochloric acid was heated under reflux, a low-boiling liquid distilled from the reaction mixture. This was collected at a vapor temperature of 45–51° C. and was identified as t-butyl chloride; yield, 20.8 g. (90 percent). In this case the reaction probably was:

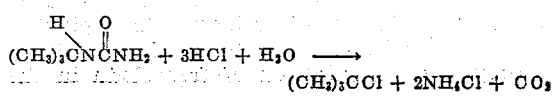

The desirability of employing alkaline hydrolysis conditions and a high boiling reaction solvent for the preparation of t-alkyl amines from N-t-alkyl ureas is illustrated by the following experiments.

To a mixture of 69.6 g. (0.6 mol) of N-t-butyl urea and 250 cc. of Cellosolve (Carbide and Carbon Chemicals Corp., ethylene glycol monoethyl ether) was added a solution of 60 g. of 97 percent sodium hydroxide in 70 cc. of water. The resulting mixture was heated under a 60 cm. Vigreux column and the t-butylamine was distilled off as formed at a vapor temperature of 44–46° C./750 mm. at a reflux ratio of 8–10 to 1; yield of crude t-butylamine, 38.3 g. (87.5 percent). After drying over potassium hydroxide pellets, the pure amine boiled sharply at 44° C./738 mm.; $n_D^{18}=$ 1.3790 (reported, $n_D^{18}=1.3794$). With benzoyl chloride, N-t-butylbenzamide melting at 135.5–136.5° C. was formed; reported, M. P. 136° C. (Beilstein, vol. 9, 1st Supplement, p. 97).

To a mixture of 130 g. (1 mol) of N-t-amyl urea and 400 cc. of Cellosolve was added a solution of 84.5 g. of 97 percent sodium hydroxide in 95 cc. of water. The mixture was heated under a 60 cm. Vigreux column, and t-amylamine was distilled off as formed at a vapor temperature of 74–76° C./734 mm.; yield, 75.4 g. (86.5 percent). After drying over potassium hydroxide pellets the t-amylamine was redistilled and boiled at 75.5–76° C./740 mm.

A mixture of 43 g. (0.25 mol) of crude N,N'-di-t-butyl urea, 125 cc. of Cellosolve, 21.5 g. of 97 percent sodium hydroxide, and 25 cc. of water was heated under a 60 cm. Vigreux column. The t-butylamine was distilled off as formed at a head temperature of 44–47° C./752 mm.; yield, 25.3 g. (70 percent).

Evidently the rate of hydrolysis of N-t-butyl urea in a low boiling reaction solvent such as isopropyl alcohol is much slower than in a high boiling solvent such as Cellosolve, as illustrated by the following experiment.

To a mixture of 29 g. (0.25 mol) of N-t-butyl urea and 100 cc. of isopropyl alcohol was added a solution of 21 g. (0.51 mol) of 97 percent sodium hydroxide in 24 cc. of water. The mixture was then refluxed under a 60-cm. Vigreux column. The head temperature rose to about 80° C., and only after fifteen hours under total reflux did the head temperature drop to 45° C., the boiling point of t-butylamine. The distillate was slowly withdrawn (reflux ratio of about 15:1), but the vapor temperature rapidly rose to 80° C., indicating that only a very small amount of t-butylamine had formed. Refluxing for two more days did not increase significantly the amount of t-butylamine formed. Evidently the rate of hydrolysis in isopropyl alcohol is much slower than in Cellosolve because of the lower boiling point of the isopropyl alcohol.

In general I prefer to use hydrolysis solvents boiling at a temperature of at least about 125° C. at atmospheric pressure. Thus I may employ ethylene glycol as a suitable hydrolysis solvent, or various alkyl ethers of ethylene glycol or diethylene glycol.

The alkylated ureas produced by the process of the present invention, particularly the N-t-butyl and N,N'-di-t-butyl ureas can be condensed with aldehydes, particularly formaldehyde to produce tough, glossy, chemically resistant resins, especially when blended with alkyd resins or oleoresinous materials.

Having thus described my invention, what I claim is:

1. The process of alkylating a urea compound selected from the group consisting of urea and N-monoalkyl ureas, which process comprises contacting at least 2 mols of a tertiary olefin with each mol of said urea compound contained in a mixture of said urea compound and sulfuric acid, said mixture containing at least about 1.5 mols of sulfuric acid having a strength of at least about 75 weight percent per mol of said urea compound, effecting said contacting at a temperature between about −20° C. and about 25° C., and separating a N-t-alkyl urea and a N,N'-di-t-alkyl urea from the products of the reaction of urea, and separating a N-monoalkyl-N'-t-alkyl urea from the products of the reaction of an N-monoalkyl urea.

2. The process of alkylating a urea compound selected from the group consisting of urea and N-monoalkyl ureas, which process comprises contacting between about 2 and about 6 mols of a tertiary olefin with each mol of said urea compound contained in a mixture of said urea compound and sulfuric acid, said mixture containing between about 1.5 and about 2.5 mols of sulfuric acid having a concentration between about 90 and 100 weight percent per mol of said urea compound, effecting said contacting at a temperature between about −20° C. and about 25° C., and separating a N-t-alkyl urea and a N,N'-di-t-alkyl urea from the products of the reaction of urea, and separating a N-monoalkyl-N'-t-alkyl urea from the products of the reaction of an N-monoalkyl urea.

3. The process of claim 2 wherein the tertiary olefin is isobutylene.

4. The process of alkylating urea, which process comprises contacting between about 2 and about 6 mols of isobutylene with each mol of urea contained in a mixture of urea and sulfuric acid, said mixture containing at least about 1.5 mols of sulfuric acid having a strength of at least about 75 weight percent per mol of urea, effecting said contacting at a temperature between about −20° C. and about 25° C., and separating a N-t-butyl urea and a N,N'-di-t-butyl urea from the reaction products.

5. The process of alkylating urea, which process comprises contacting between about 4 and about 6 mols of isobutylene with each mol of urea contained in a mixture of urea and sulfuric acid, said mixture containing between about 1.5 and about 2.5 mols of sulfuric acid having a concentration between about 95 and 100 weight percent per mol of said urea, effecting said contacting at a temperature between about −15° C. and about 5° C., and separating N-t-butyl urea and N,N'-di-t-butyl urea from the reaction products.

6. The process of alkylating a urea compound selected from the group consisting of urea and N-monoalkyl ureas, which process comprises mixing said urea compound with sulfuric acid having a strength of at least about 75 weight precent in a proportion of at least about 1.5 mols of sulfuric acid per mol of said urea compound, thereafter incrementally introducing into the resultant mixture a tertiary olefin while maintaining the temperature between about −20° C. and about 25° C., continuing the introduction of said tertiary olefin into said mixture until between about 2 and about 6 mols of said tertiary olefin have been introduced per mol of said urea compound in said mixture, and thereafter separating a N-t-alkyl urea and a N,N'-di-t-alkyl urea from the products of the reaction of urea, and separating a N-monoalkyl-N'-t-alkyl urea from the products of the reaction of an N-monoalkyl urea.

7. The process of claim 6 wherein the tertiary olefin is isobutylene.

8. The process of alkylating a N-monoalkyl urea, which process comprises contacting at least about 2 mols of a tertiary olefin with each mol of said N-monoalkyl urea contained in a mixture of said N-monoalkyl urea and sulfuric acid, said mixture containing at least about 1.5 mol of sulfuric acid having a strength of at least about 75 weight percent per mol of said N-monoalkyl urea, effecting said contacting at a temperature between about −20° C. and about 25° C. and separating a N-monoalkyl, N'-tert-alkyl urea from the reaction products.

9. The process of claim 8 wherein the tertiary olefin is isobutylene.

10. The process of claim 8 wherein the N-monoalkyl urea is N-t-butyl urea.

11. The process of claim 8 wherein N-monoalkyl urea is N-t-butyl urea and the tertiary olefin is isobutylene.

12. The process of alkylating a N-mono-t-alkyl urea, which process comprises contacting between about 2 and about 6 mols of a tertiary olefin with each mol of said N-mono-t-alkyl urea contained in a mixture of said N-mono-t-alkyl urea and sulfuric acid, said mixture containing at least about 1.5 and about 2.5 mols of sulfuric acid having a strength between about 90 and 100 weight percent per mol of said N-mono-t-alkyl urea, effecting said contacting at a temperature between about −20° C. and about 25° C. and separating a N,N'-di-t-alkyl urea from the reaction products.

13. The process of alkylating urea, which process comprises contacting at least 2 mols of a tertiary olefin with each mol of urea contained in a mixture of urea and sulfuric acid, said mixture containing at least about 1.5 mols of sulfuric acid having a strength of at least about 75 weight percent per mol of urea, effecting said contacting at a temperature between about −20° C. and about 25° C., and thereafter diluting the reaction mixture with at least about 1 volume of water, thereby precipitating a N,N'-di-t-alkyl urea from the reaction products.

14. The process of alkylating urea, which process comprises contacting between about 2 and about 6 mols of a tertiary olefin with each mol of urea contained in a mixture of urea and sulfuric acid, said mixture containing between about 1.5 and about 2.5 mols of sulfuric acid having a concentration between about 90 and 100 weight percent per mol of urea, effecting said contacting at a temperature between about −20° C. and about 25° C., and thereafter diluting the reaction mixture with at least about 1 volume of water, thereby precipitating a N,N'-di-t-alkyl urea from the reaction products.

15. The process of claim 14 wherein said tertiary olefin is isobutylene and wherein said N,N'-di-t-alkyl urea is N,N'-di-t-butyl urea.

HERBERT C. BROWN.

REFERENCES CITED

The following references are of record in the file of this patent:

UNITED STATES PATENTS

| Number | Name | Date |
|---|---|---|
| 2,247,495 | Harvey et al. | May 1, 1941 |